Patented July 28, 1936

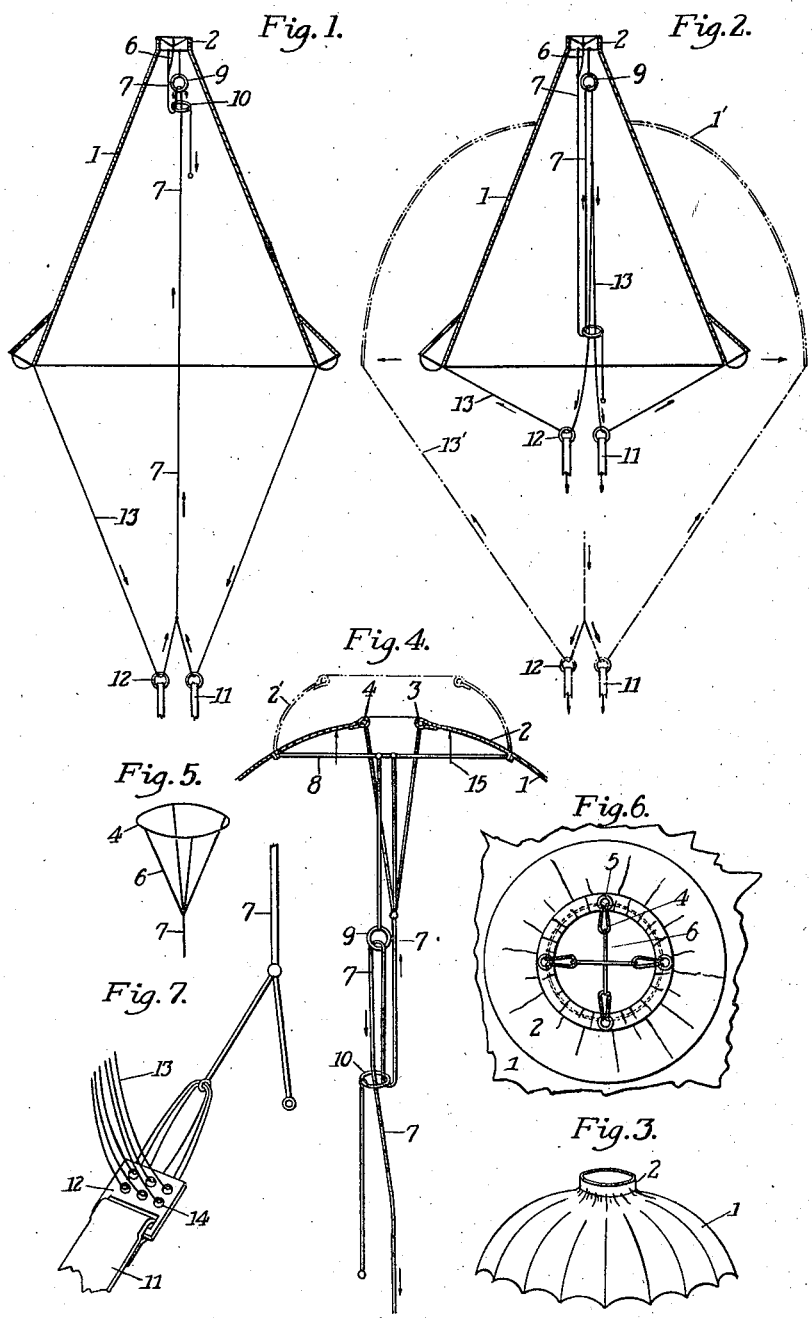

2,048,963

UNITED STATES PATENT OFFICE 2,048,963

PARACHUTE

Sueto Nonaka, Naoiri-Gun, Japan

Application July 31, 1935, Serial No. 34,074

2 Claims. (Cl. 244—21)

This invention relates to a parachute usually employed as life-saving means for use from disabled aircraft, and has for its object to provide an improved parachute which can open promptly with minimum shock of opening.

With the above object in view, the improved parachute according to this invention comprises an umbrella or parachute body having an adjustable air escape port in the central portion thereof, a plurality of operative cords for adjusting the degree of opening of said port, the central suspension cord which is connected at its upper end to said operating cords, a fixed ring suspended from a point near said air escape port, a floating ring located lower than said fixed ring, a common ring member formed with a plurality of perforations and attached to the harness, and a plurality of shroud cords or peripheral suspension cords passed through the perforations of said common eye member, said central suspension cord being first passed through said floating ring, then through said fixed ring, and again through said floating ring, and being lastly connected to said shroud cords which have been passed through said common eye member.

In the accompanying drawing in which one embodiment of the invention is shown by way of example:—

Figure 1 is a vertical section of the parachute according to this invention, with the harness omitted;

Figure 2 is a similar view showing another position of the operating means;

Figure 3 is a perspective view of the parachute body;

Figure 4 shows in detail the adjustable air escape port at the top of the parachute body and means including the central suspension cord for adjusting said port;

Figure 5 is a diagrammatic view showing the connection of the annular cord which is passed through the inner periphery of the annular flap forming the air escape port and operating cords therefor;

Figure 6 is an inner plan view showing the air escape port when throttled; and

Figure 7 is a perspective view of a common eye member having a plurality of perforations and connected to the harness.

Similar numerals of reference refer to similar parts throughout the several views.

Referring to the drawing, 1 designates the umbrella or parachute body made of fabric, the central portion of which is cut out and is provided with a short cylindrical flap portion 2 made of fabric, forming an adjustable air escape port. The annular free edge of said flap portion 2 is formed with a bead or tube 3, through which is passed a cord 4. The tube 3 is provided with four eyelets 5 arranged diametrically opposite to each other as shown in Fig. 6, and operating cords 6 are connected to said cord 4, which is passed through said four eyelets 5. The free ends of said operating cords 6 are converged into one point and connected to a point in the upper portion of a central suspension cord 7, which in turn is connected at its upper end to a horizontal supporting cord 8. Fastened to and suspended from the supporting cord 8 is an upper or fixed ring 9. The central suspension cord 7 is first passed through a floating ring 10 which is located lower than said fixed ring 9, when it is passed through said fixed ring 9, and then it is passed again through the floating ring 10, as shown in Fig. 4. The lower end of the suspension cord 7 is diverged, and each end is fastened to peripheral suspension cords or shroud cords 13 which have been passed through the perforations formed in the common eye member 12.

Each common eye member 12 is secured to one of the suspension bands 11 of the harness and is provided with a plurality of limit perforations 14 corresponding in number to half of the whole number of the shroud cords 13, each of said limit perforations 14 receiving a single shroud cord 13. In Figs. 1 and 2, for the sake of convenience, the member 12 is shown as comprising a single ring.

In the position shown in Fig. 1, when the floating ring 10 is pulled downwardly, the central suspension cord 7 is shortened, the length of the loop portions between the upper and lower rings 9 and 10 being increased, so that the lower parts of the shroud cords 13 are pulled inwardly and upwardly, and the effective length thereof is temporarily shortened, as shown in Fig. 2. Therefore, when the parachute pack is released, resistance will be immediately produced on the periphery of the parachute body because of the shortened length of the shroud cords 13 between the periphery of the parachute body and the bands 11 of the harness, so that the central portion is first pulled, the shroud cords being lengthened as shown by dot-and-dash lines 13', and the parachute body 1 will be opened into a dome shape 1' as shown in Fig. 2. Thus, the periphery of the parachute body is stretched promptly and in natural manner, without being subjected to strong pull. When atmospheric pressure 15 confined by the opened parachute body increases, the upper end of the central suspension cord 7 receives a pull from the operating cords 6, so that the suspension cord will be stretched upwardly, whereby enlarging the air escape port, annular flap portion 2 assuming the position 2'. Consequently, the rate of escape of air increases, thereby decreasing the inner pressure. Thus, it will be seen that, while the parachute according to this invention opens very promptly, the shock of opening can be considerably minimized. As hereinbefore mentioned, the central portion of the parachute body is first pulled and the periphery is developed outwardly, so that the air confined in the parachute body would not be so heavily compressed as to cause considerable rise of the inner pressure 15. This is also advantageous in minimizing the shock of opening.

When the parachute opens and its periphery spreads wider, the shroud cords pull the central suspension cord. But, when the point of connection of the shroud cords 13 and the central suspension cord 7 reaches the common eye member 12, the movement of said cords is limited by the limit perforations 14. Thus, it will be seen that the perforated member 12 serves to limit the degree of opening of the parachute, and at the same time it prevents the shroud cords from being entangled, whereby permitting safe operation.

What I claim is:—

1. An improved parachute comprising a parachute body having an adjustable air escape port in the central portion thereof, a plurality of operating cords for adjusting the degree of opening of said port, a central suspension cord which is connected at its upper end to said operating cords, a fixed ring suspended from the central portion of the parachute body, a floating ring located lower than said fixed ring, a common eye member having a plurality of perforations, and a plurality of shroud cords or peripheral suspension cords passed through the perforations of said common eye member, said central suspension cord being first passed through said floating ring, then through said fixed ring, and again through said floating ring, and being lastly connected to said shroud cords which have been passed through the common eye member.

2. An improved parachute according to claim 1, wherein the suspension or shroud cords connected to the periphery of the parachute body are passed through the limit perforations formed in the common eye plate attached to the harness and are connected to the lower end of the central suspension cord, the arrangement being such that the shroud cords are able to pull the central suspension cord for a predetermined extent, permitting the widening of the parachute body being opened.

SUETO NONAKA.